(12) United States Patent
Edmond et al.

(10) Patent No.: US 7,255,132 B2
(45) Date of Patent: Aug. 14, 2007

(54) CONTROL VALVE FOR CONTROLLING FLOW OF HYDRAULIC FLUID

(75) Inventors: George Edmond, Norfolk (GB); Steven Kenchington, Norfolk (GB); Simon Paul Kuderovitch, Norfolk (GB)

(73) Assignee: Lotus Cars Limited, Norfolk (GB)

( * ) Notice: Subject to any disclaimer, the term of this patent is extended or adjusted under 35 U.S.C. 154(b) by 333 days.

(21) Appl. No.: 10/522,323

(22) PCT Filed: Jul. 30, 2003

(86) PCT No.: PCT/GB03/03209

§ 371 (c)(1), (2), (4) Date: Jan. 24, 2005

(87) PCT Pub. No.: WO2004/011833

PCT Pub. Date: Feb. 5, 2004

(65) Prior Publication Data

US 2005/0257842 A1 Nov. 24, 2005

(30) Foreign Application Priority Data

Jul. 30, 2002 (GB) ................................. 0217641.0

(51) Int. Cl.
*F15B 13/044* (2006.01)
(52) U.S. Cl. .............................. 137/625.65; 137/625.68
(58) Field of Classification Search ........... 137/625.25, 137/625.65, 625.67, 625.68
See application file for complete search history.

(56) References Cited

U.S. PATENT DOCUMENTS

| | | | |
|---|---|---|---|
| 1,785,289 A * | 12/1930 | Tuker | 137/625.68 |
| 2,705,020 A * | 3/1955 | Frantz | 137/625.25 |
| 3,548,877 A | 12/1970 | Aumayer | |
| 3,768,518 A * | 10/1973 | Roth et al. | 137/625.68 |
| 3,818,941 A | 6/1974 | Maron | |
| 3,848,637 A * | 11/1974 | Wilson | 137/625.27 |
| 4,491,153 A * | 1/1985 | Bartholomaus | 137/625.65 |

(Continued)

FOREIGN PATENT DOCUMENTS

DE  42 36 681 A1  5/1993

(Continued)

*Primary Examiner*—John Rivell
(74) *Attorney, Agent, or Firm*—Fulwider Patton LLP

(57) ABSTRACT

The present invention relates to a control valve for controlling flow of hydraulic fluid. The control valve comprises: a valve housing (10); a sleeve (11) slidable in a valve chamber in the valve housing (10); a first fluid conduit (12) for connecting the valve chamber to a source of pressurised hydraulic fluid; a second fluid conduit (14) for connecting the valve chamber to a fluid return for returning hydraulic fluid to a reservoir; and a third fluid conduit (16) for connecting the valve chamber to deliver hydraulic fluid to and receive hydraulic fluid from apparatus which uses the hydraulic fluid flow controlled by the control valve. The sleeve (11) is a tubular sleeve having a tubular passage therethrough. The valve housing has a pair of spaced apart valve seat surfaces (22, 23), a first valve seat surface (22) which is engageable by a first end of the tubular sleeve (11) and a second valve seat surface (23) which is engageable by a second end of the tubular sleeve (11). The third fluid conduit (16) opens on to the valve chamber by way of a port which is surrounded by the first valve seat surface (22).

14 Claims, 3 Drawing Sheets

U.S. PATENT DOCUMENTS

| | | | | |
|---|---|---|---|---|
| 4,548,383 A | * | 10/1985 | Wolfges | 137/625.68 |
| 4,565,217 A | | 1/1986 | McIntyre | |
| 4,887,643 A | * | 12/1989 | Tomlin et al. | 137/625.68 |
| 4,917,150 A | | 4/1990 | Koch et al. | |
| 4,979,542 A | * | 12/1990 | Mesenich | 137/625.65 |
| 5,036,885 A | * | 8/1991 | Miura | 137/625.65 |
| 5,064,166 A | | 11/1991 | Schechter | |
| 5,211,198 A | | 5/1993 | Tinholt | |
| 5,246,033 A | * | 9/1993 | Brehm et al. | 137/625.65 |
| 5,778,932 A | * | 7/1998 | Alexander | 137/625.65 |
| 6,263,913 B1 | | 7/2001 | Kussel | |
| 6,578,606 B2 | * | 6/2003 | Neuhaus et al. | 137/625.65 |

FOREIGN PATENT DOCUMENTS

| | | | | |
|---|---|---|---|---|
| EP | 1 255 066 A2 | | 11/2002 | |
| GB | 2008230 A | * | 5/1979 | 137/625.68 |
| GB | 2 056 627 A | | 5/1981 | |
| GB | 2 071 279 A | | 9/1981 | |

* cited by examiner

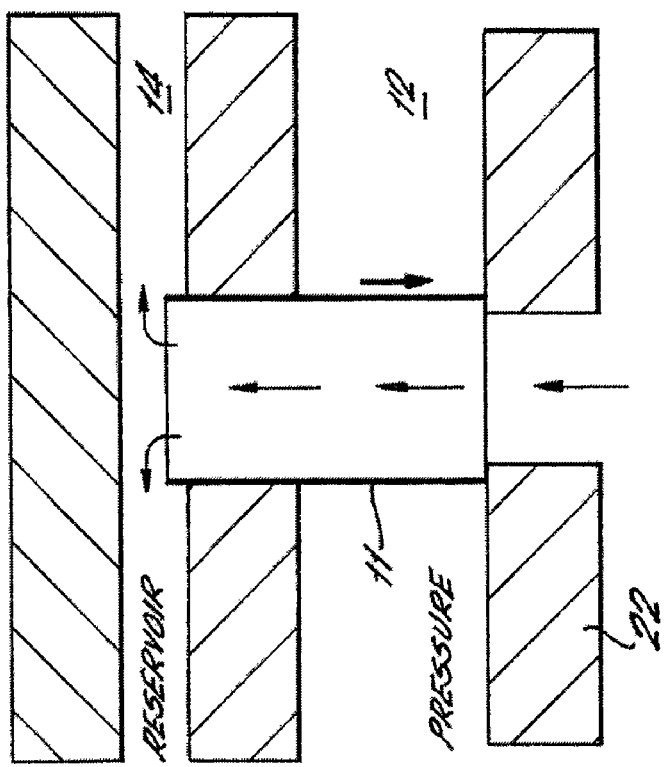
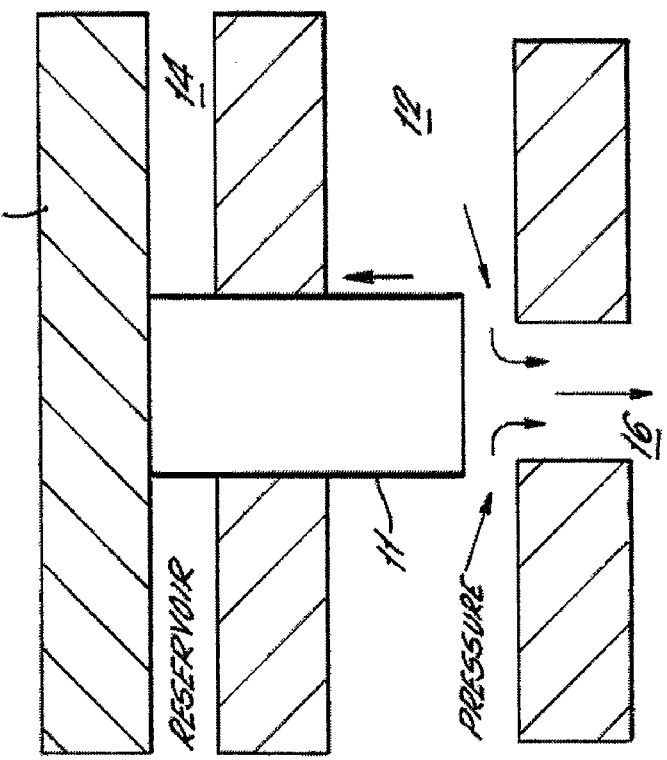

CONTROL VALVE FOR CONTROLLING FLOW OF HYDRAULIC FLUID

This application is a U.S. national phase of PCT/GB2003/003209, filed 30 Jul. 2003, which claims priority from Great Britain Application Serial No. 0217641.0, filed Jul. 30, 2002.

This invention relates to a control valve for controlling flow of hydraulic fluid.

U.S. Pat. No. 5,064,166 describes a solenoid valve for controlling flow of hydraulic fluid. The valve comprises an armature formed as a sleeve having one end closing against a valve seat. The valve described is a metering valve which controls the rate of flow of fluid through it, but which does not control itself the direction of flow. In particular, the valve does not have connections to both a pressure line and a return line.

The present invention in a first aspect provides a control valve for controlling flow of hydraulic fluid, the control valve comprising:
 a valve housing;
 a sleeve slidable in a valve chamber in the valve housing;
 a first fluid conduit for connecting the valve chamber to a source of pressurised hydraulic fluid;
 a second fluid conduit for connecting the valve chamber to a fluid return for returning hydraulic fluid to a reservoir;
 a third fluid conduit for connecting the valve chamber to deliver hydraulic fluid to and receive hydraulic fluid from apparatus which uses the hydraulic fluid flow controlled by the control valve;

wherein:
 the sleeve is a tubular sleeve having a tubular passage therethrough;
 the valve housing has a pair of spaced apart valve seat surfaces, a first valve seat surface which is engageable by a first end of the tubular sleeve and a second valve seat surface which is engageable by a second end of the tubular sleeve;
 the third fluid conduit opens on to the valve chamber by way of a port which is surrounded by the first valve seat surface; and
 when the first end of the tubular sleeve engages the first valve seat surface then fluid flows through the tubular passage in the sleeve from the third fluid conduit to the second fluid conduit and when the second end of the tubular sleeve engages the second valve seat surface then fluid flows through a gap between the first end of the tubular sleeve and the first valve seat to the third fluid conduit from the first fluid conduit.

The present invention in a second aspect provides a control valve for controlling flow of hydraulic fluid, the control valve comprising:
 a valve housing;
 a sleeve slidable in a valve chamber in the valve housing;
 a first fluid conduit for connecting the valve chamber to a source of pressurised hydraulic fluid;
 a second fluid conduit for connecting the valve chamber to a fluid return for returning hydraulic fluid to a reservoir;
 a third fluid conduit for connecting the valve chamber to deliver hydraulic fluid to and receive hydraulic fluid from apparatus which uses the hydraulic fluid flow controlled by the control valve, wherein:
 the sleeve is a tubular sleeve having a tubular passage therethrough;
 the valve housing has a pair of spaced apart valve seat surfaces, a first valve seat surface which is engageable by a first end of the tubular sleeve and a second valve seat surface which is engageable by a second end of the tubular sleeve;
 the third fluid conduit opens on to the valve chamber by way of a port which is surrounded by the first valve seat surface; and
 when the first end of the tubular sleeve valve engages the first valve seat surface then fluid flows through the tubular passage in the sleeve to the third fluid conduit from the first conduit and when the second end of the tubular sleeve engages the second valve seat surface then fluid flows through a gap between the first end of the tubular sleeve valve and the first valve seat from the third fluid conduit to the second fluid conduit.

Both aspects of the invention share a common inventive feature that a sleeve is used to seal against two different end surfaces of the valve. In U.S. Pat. No. 5,064,166 the tubular sleeve valve seals against only one end surface. The present invention provides a valve which has a connection to both a pressure line and a return line and which can control flow of fluid from the pressure line through the valve or flow through the valve back to a return line.

A preferred embodiment of a control valve according to the present invention will now be described with reference to the accompanying drawings, in which:

FIGS. 2a and 2b are schematic illustrations of how the valve of FIG. 1 can be used in a first mode of operation.

Figure 1:
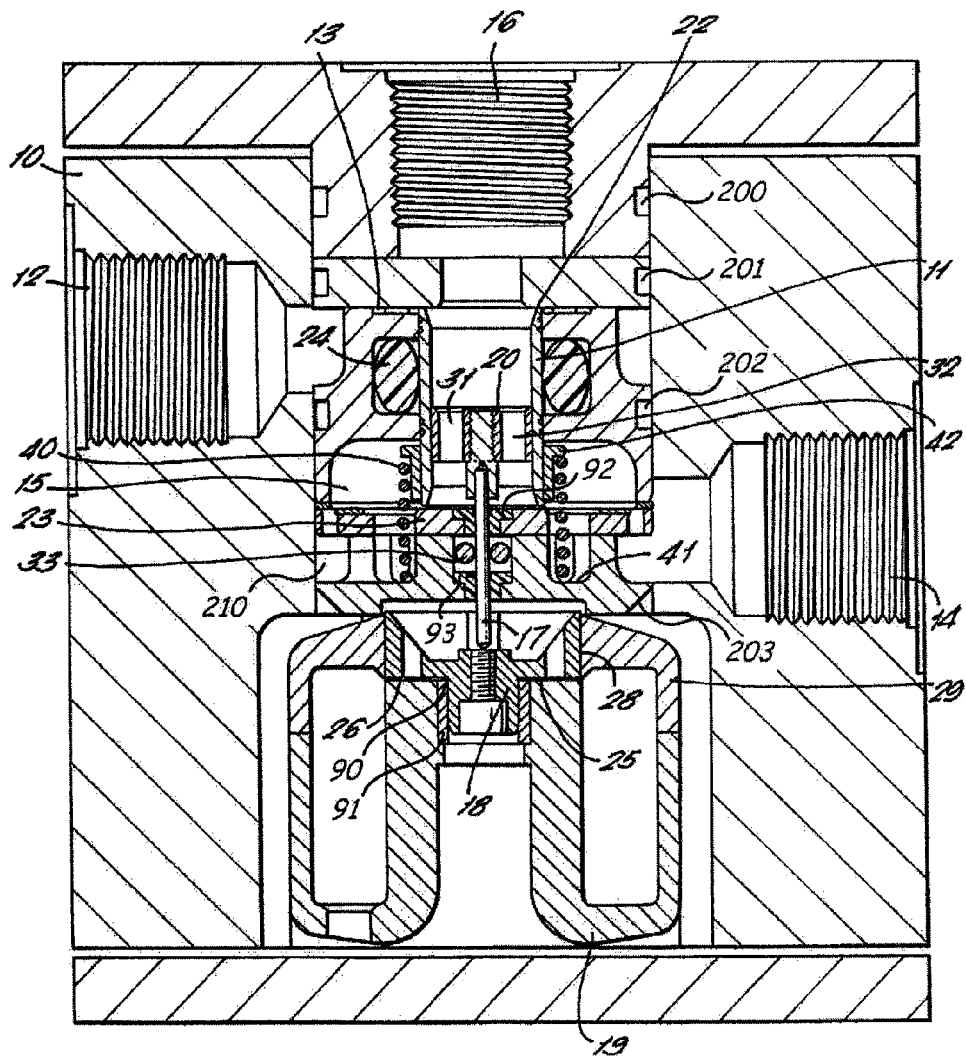
FIG. 1 is a cross-section through a control valve according to the invention.

Turning first to FIG. 1 there can be see in the Figure a valve having a housing 10 and a sleeve 11 slidable in a valve chamber defined in the housing. The valve chamber is formed from a single bore drilled through the housing 10. A first conduit 12 connects the valve chamber to a source of pressurised fluid (not shown). The first conduit 12 opens onto the valve chamber by way of a gallery 13.

The control valve has a second conduit 14 for connecting the valve chamber to a return line for returning hydraulic fluid to a reservoir (not shown in FIG. 1). The second conduit communicates with the valve chamber via a gallery 15.

A third conduit 16 is provided for connecting the valve chamber to a fluid conduit (not shown) which is connected to e.g. an actuator to allow flow of hydraulic fluid to and from the actuator.

The valve chamber has two spaced apart valve seats 22 and 23. The third conduit 16 opens on to the valve chamber by way of a port which is surrounded by the valve seat 22.

The sleeve 11 is a cylindrical tubular sleeve. The sleeve 11 is connected by a control rod 17 to an armature 18 which moves under the influence of a magnetic field generated by an electrical coil 19. The rod 17 extends out of the valve chamber to the armature 18 which is located outside of the valve chamber along with the electrical coil 19. There can be seen in the figure a seal 33 which surrounds the rod 17 and prevents the passage of fluid from the valve chamber past the rod 17. The seal 33 is a deformable O ring which will roll as the rod 17 moves up and down so that there is no sliding contact between them. The seal 33 is held in place by a pair of bearings 92, 93. Each bearing 92, 93 is a split bearing assembled surrounding the rod 17.

The sleeve 11 has a cylindrical wall which is tapered at both ends. This feature minimises the differential force across the sleeve 11 when the sleeve engages one of the valve seats 22, 23. The rod 17 is also kept slender to minimise the differential force which arises across the valve due to a difference in areas in the opposed surfaces of the sleeve 11. It is possible to keep the diameter of the rod 17 small because the forces applied thereto place it in tension and the rod 17 is not subjected to a bending moment or to a compressive force which might cause it to buckle.

The control rod 17 is connected to the sleeve 11 by a support 20, the support 20 having a plurality of drillings e.g. 31, 32 therethrough to allow hydraulic fluid to flow freely through a tubular passage in the sleeve 11.

In FIG. 1 there can be seen a spring 40 which acts between a spring seat 41 provided in the valve housing and a spring seat 42 fixed to the exterior of the sleeve 11. The spring 40 will act to bias the sleeve 11 into engagement with the valve seat 22. The spring seat 41 is provided by a washer which acts as a shim. Different depths of washer 41 can be chosen to vary a preload applied by spring 40 on the sleeve 11.

The spring 40 will apply a preload on the sleeve 11 which will have to be overcome before the sleeve 11 is moved. The spring rate of the spring 40 will be low once the preload has been overcome so as not to impede the motion of the sleeve 11. The use of a preloaded spring will help reduce the need for close tolerances because any variation in component size can be compensated for by the spring 40 and by the choice of a suitable shim 41. The preload of the spring 40 will also help to reduce vibration of the components of the valve, especially with a low mass armature. The use of a high preload and low spring rate spring 40 is ideal when the valve is used as a bistable toggle valve switching between two conditions. If it were desired to adapt the valve for use as a metering valve then a higher spring rate spring would be desirable.

When activated the magnetic field generated by the electrical coil 19 will act to draw the surface 25 of the armature 18 into engagement with the surface 26 of the electrical coil 19. This will be done against the preload of the spring 40. A mechanical end stop will be provided to ensure that the face 25 of the armature 18 does not actually abut with the face 26 of the electrical coil because of the noise and wear problems that this would generate.

The area of the surface 26 is maximised by forming an inwardly extending annular lip 90 on a casing component 91 which surrounds the inner surface of the coil 19. The shape of the armature 18 is chosen to keep its mass low.

The armature 18 illustrated in FIG. 1 is chosen to have a planar annular surface 25 which faces a planar annular surface 26 of the electrical coil 19. The armature 18 also has a cylindrical outer surface 28 which faces a cylindrical surface of an element 29 which is used to form a magnetic field loop with the electrical coil 19 and the armature 18. The surface of the armature 18 which faces away from the flat surface 25 is frusto-conical in nature in order to encourage a good flux linkage across the armature whilst keeping the mass of the armature 18 low and stifling the creation of eddy currents.

It is desired that the components 29, 18 and 91 are all made from high silicon content steel in order to reduce eddy currents and to maximise rate of decay of magnetic force in the absence of current in coil 19. The components will not in use become saturated because the valve will be switched at a high frequency.

The working of the control valve illustrated in FIG. 1 is shown schematically in FIGS. 2a and 2b. When the sleeve 11 is forced by the coil 19 (via the rod 17) into engagement with the valve seat 23 then fluid can flow from the source of pressure through the conduit 12 to the fluid conduit 16 and thereby e.g. to an actuator. The fluid conduit 14 is sealed off by engagement of the tubular sleeve 11 with the valve seat 23.

When the valve 11 is displaced by spring 40 from its position in FIG. 2a into engagement with the valve seat 22 then fluid can flow from the fluid conduit 16 through the tubular passage in the sleeve 11 via the gallery 15 to the fluid conduit 14 which allows for return of the hydraulic fluid to a fluid reservoir. The fluid conduit 12 is sealed off by engagement of the tubular sleeve 11 with the valve seat 22.

There can be seen in FIG. 1 an O-ring 24 which surrounds the exterior surface of the sleeve 11 and prevents flow of hydraulic fluid from the fluid conduit 12 to the fluid conduit 14 through the annular gap between the sleeve 11 and the surrounding valve housing. The O-ring 24 deforms elastically on sliding of the sleeve 11 so that there is no sliding motion between the seal 24 and the sleeve 11.

A plurality of ring seals 200, 201, 202 and 203 act between the external surface of the inner parts of the valve and the surrounding surface of the valve housing to prevent escape of fluid from the valve chamber and to prevent flow of fluid past the valve components from the pressure line 12 to the return line 14. It is possible that these could be replaced by a labyrinth seal arrangement.

In the FIG. 1 there can be seen an annular aperture 210 surrounding the washer 41. This allows communication between the cavity in which the spring 40 is located and the gallery 15 and therefore the return line 14. This prevents a build up of fluid pressure in the spring cavity which might inhibit the action of the spring 40.

The illustrated valve is a digital switching valve, which will switch the fluid conduit 16 between communication with the pressure line attached to the valve and the return line attached to the valve. The valve will be bi-stable. The position of the sleeve 11 will not be precisely controlled in order to specify a gap of a chosen distance between the sleeve 11 and one of the end faces 22 and 23 in order to meter the flow of fluid through the valve. Metering of the flow of fluid through the valve will be achieved by supplying a pulse width modulated control signal to the valve so that the frequency of switching of the sleeve 11 between its two extreme positions will control the rate of flow of fluid through the valve.

With the valve operating as described above the control line 16 is always isolated from the pressure line 12 unless the valve is powered, because of the action of the spring 40. This is generally a preferred failsafe arrangement. Also in use of the valve in a system for hydraulically lifting engine valves the valve will connect an actuator for an engine valve to the return line for a greater percentage of time than it connects the actuator to the pressure line. Thus the component described above saves energy since the valve is not powered when connecting the actuator to the return line.

Whilst above the valve has been described with the fluid conduit 12 being connected to a source of pressurised fluid and the fluid conduit 14 being connected to a reservoir for storing hydraulic fluid, this situation could be reversed. In other words, the fluid conduit 12 could be connected to the reservoir of hydraulic fluid and the fluid conduit 14 could be connected to the source of pressurised fluid. The result of this changed arrangement can be seen in FIGS. 3a and 3b.

Figure 3B:
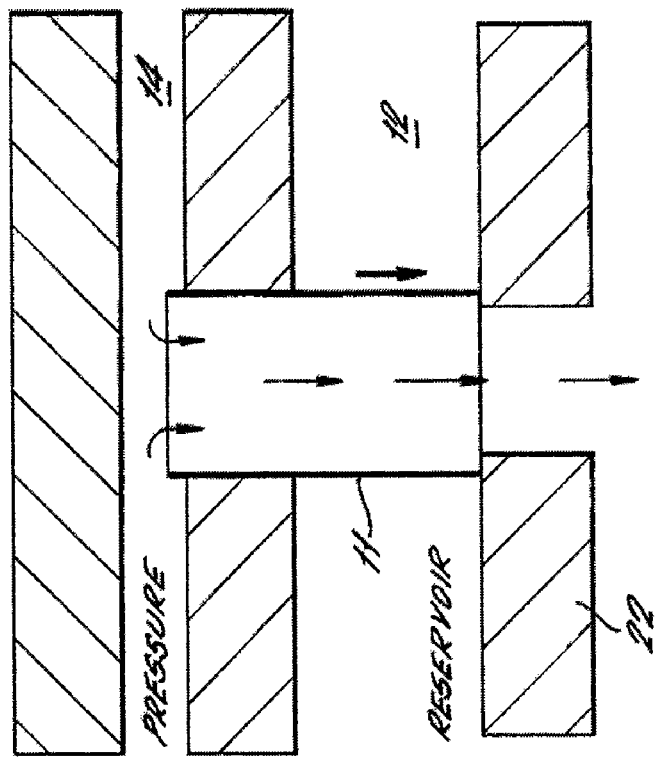
FIGS. 3a and 3b are schematic illustrations of how the valve of FIG. 1 can be used in a second mode of operation.
Figure 3A:
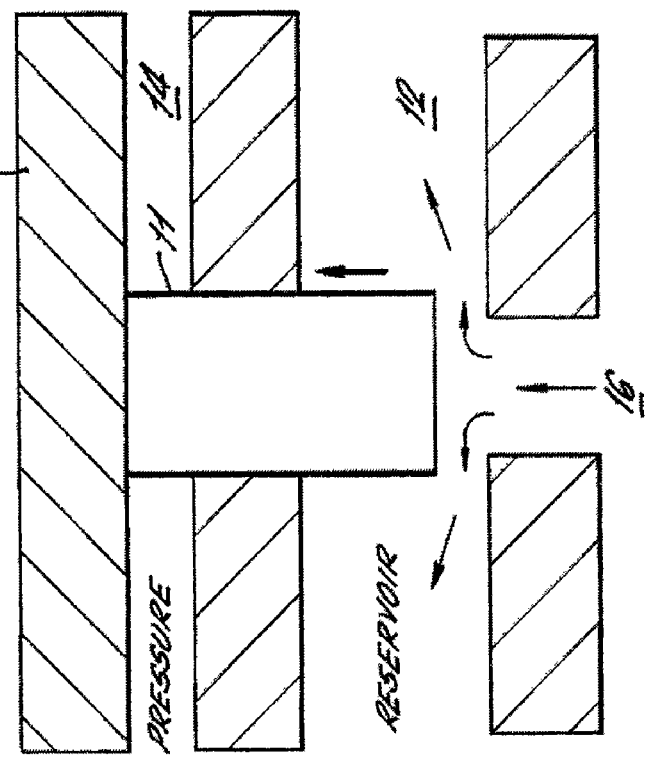

In FIG. 3a the sleeve 11 is displaced into engagement with the sealing surface 23. In this condition hydraulic fluid flows from the fluid conduit 16 via the conduit 12 to a reservoir of hydraulic fluid. In FIG. 3b the sleeve 11 seals against the valve seat 22. In this condition, the pressurised hydraulic fluid flows through the fluid conduit 14 through the passage in the centre of the sleeve 11 and then to the fluid conduit 16 for delivery e.g. to an actuator.

The "O" rings 33 and 24 mentioned above could be bonded respectively to the rod 17 and the sleeve 11 and/or to the facing surfaces of the valve housing. The "O" rings 33, 24 would then flex to allow the necessary movement. Indeed it is possible that the resilience of the seals 33, 24 could be used to provide a biassing force instead of the spring 40.

The spring 40 illustrated above could be a single spring or a stack of springs.

The assembly of sleeve 11, armature 18, rod 17 and support 20 could be replaced by a single component having all elements integrally formed as portions thereof.

The invention claimed is:

1. A control valve for controlling flow of hydraulic fluid, the control valve comprising:
    a valve housing;
    a sleeve slidable in a valve chamber in the valve housing;
    a first fluid conduit for connecting the valve chamber to a source of pressurised hydraulic fluid;
    a second fluid conduit for connecting the valve chamber to a fluid return for returning hydraulic fluid to a reservoir;
    a third fluid conduit for connecting the valve chamber to deliver hydraulic fluid to and receive hydraulic fluid from apparatus which uses the hydraulic fluid flow controlled by the control valve, wherein:
    the sleeve is a tubular sleeve having a tubular passage therethrough;
    the valve housing has a pair of spaced apart valve seat surfaces, a first valve seat surface which is engageable by a first annular end surface of the tubular sleeve and a second valve seat surface which is engageable by a second annular end surface of the tubular sleeve;
    the third fluid conduit opens on to the valve chamber by way of a port which is surrounded by the first valve seat surface; and
    when the first annular end surface of the tubular sleeve engages the first valve seat surface then fluid flows through the tubular passage in the sleeve from the third fluid conduit to the second fluid conduit and when the second annular end surface of the tubular sleeve engages the second valve seat surface then fluid flows through a gap between the first end of the tubular sleeve and the first valve seat to the third fluid conduit from the first fluid conduit; wherein:
    a spring means biases the sleeve into engagement with the first valve seat surface;
    characterised in that:
    the spring means acts directly on the sleeve;
    the tubular sleeve is connected by a rod to an armature located outside the valve chamber, the armature being located within an electrical coil also located outside the valve chamber;
    the spring means comprises a spring which acts between a spring seat provided in the valve housing and a spring seat fixed to the exterior of the sleeve; and
    the only forces applied to the rod are forces which place the rod in tension, the spring acting to move the sleeve into engagement with the first valve seat surface.

2. A control valve as claimed in claim 1 wherein the spring means applies a preload on the sleeve which must be overcome by a magnetic force applied to the armature by a magnetic field generated by the electrical coil before the sleeve moves away from the first valve seat surface.

3. A control valve as claimed in claim 1 wherein a compliant seal is provided to act between the exterior of the tubular sleeve and facing surface of the valve housing in order to prevent fluid passing along the outside of the tubular sleeve between the first and second fluid conduits and wherein the compliant seal deforms when the sleeve slides in the valve chamber so as to reduce or prevent sliding contact between the sleeve and the compliant seal.

4. A control valve as claimed in claim 1 wherein the first fluid conduit opens on to the valve chamber by way of a gallery which surrounds a first end of the tubular sleeve valve proximate the first annular end surface.

5. A control valve as claimed in claim 1 wherein the second fluid conduit opens on to the valve chamber by way of a gallery which surrounds a second end of the tubular sleeve valve proximate the second annular end surface.

6. A control valve as claimed in claim 1 wherein the tubular sleeve valve has a tubular wall which tapers in thickness at both ends of the tubular sleeve valve.

7. A control valve system for controlling a hydraulic actuator which has a control valve as claimed in claim 1, wherein the control valve is operated as a digital valve with rate of fluid flow through the control valve varied by controlling a timing of switching of the sleeve between engagement with the first and second valve seats.

8. A control valve for controlling flow of hydraulic fluid, the control valve comprising:
    a valve housing;
    a sleeve slidable in a valve chamber in the valve housing;
    a first fluid conduit for connecting the valve chamber to a source of pressurised hydraulic fluid;
    a second fluid conduit for connecting the valve chamber to a fluid return for returning hydraulic fluid to a reservoir;
    a third fluid conduit for connecting the valve chamber to deliver hydraulic fluid to and receive hydraulic fluid from apparatus which uses the hydraulic fluid flow controlled by the control valve, wherein:
    the sleeve is a tubular sleeve having a tubular passage therethrough;
    the valve housing has a pair of spaced apart valve seat surfaces, a first valve seat surface which is engageable by a first annular end surface of the tubular sleeve and a second valve seat surface which is engageable by a second annular end surface of the tubular sleeve;
    the third fluid conduit opens on to the valve chamber by way of a port which is surrounded by the first valve seat surface; and
    when the first annular end surface of the tubular sleeve valve engages the first valve seat surface then fluid flows through the tubular passage in the sleeve to the third fluid conduit from the first conduit and when the second annular end surface of the tubular sleeve engages the second valve seat surface then fluid flows through a gap between the first end of the tubular sleeve and the first valve seat from the third fluid conduit to the second fluid conduit; wherein:
    a spring means biases the sleeve into engagement with the first valve seat surface;
    characterised in that:
    the spring means acts directly on the sleeve;
    the tubular sleeve is connected by a rod to an armature located outside the valve chamber, the armature being located within an electrical coil also located outside the valve chamber;
    the spring means comprises a spring which acts between a spring seat provided in the valve housing and a spring seat fixed to the exterior of the sleeve; and the only forces applied to the rod are forces which place the rod in tension, the spring acting to move the sleeve into engagement with the first valve seat surface.

9. A control valve as claimed in claim 8 wherein the spring means applies a preload on the sleeve which must be overcome by a magnetic force applied to the armature by a magnetic field generated by the electrical coil before the sleeve moves away from the first valve seat surface.

10. A control valve as claimed in claim 8 wherein a compliant seal is provided to act between the exterior of the tubular sleeve and facing surface of the valve housing in order to prevent fluid passing along the outside of the tubular sleeve between the first and second fluid conduits and wherein the compliant seal deforms when the sleeve slides in the valve chamber so as to reduce or prevent sliding contact between the sleeve and the compliant seal.

11. A control valve as claimed in claim 8 wherein the first fluid conduit opens on to the valve chamber by way of a gallery which surrounds a second end of the tubular sleeve valve proximate the second annular end surface.

12. A control valve as claimed in claim 8 wherein the second fluid conduit opens on to the valve chamber by way of a gallery which surrounds a first end of the tubular sleeve valve proximate the first annular end surface.

13. A control valve as claimed in claim 8 wherein the tubular sleeve valve has a tubular wall which tapers in thickness at both ends of the tubular sleeve valve.

14. A control valve system for controlling a hydraulic actuator which has a control valve as claimed in claim 8, wherein the control valve is operated as a digital valve with rate of fluid flow through the control valve varied by controlling a timing of switching of the sleeve between engagement with the first and second valve seats.

* * * * *